(12) United States Patent
Suhara et al.

(10) Patent No.: US 9,996,946 B2
(45) Date of Patent: Jun. 12, 2018

(54) MAINTENANCE SUPPORTING SYSTEM AND MAINTENANCE SUPPORTING METHOD UTILIZING A REFERENCE IMAGE AND INDICATOR

(71) Applicant: MITSUBISHI AIRCRAFT CORPORATION, Aichi (JP)

(72) Inventors: Masayoshi Suhara, Tokyo (JP); Toshikazu Shigetomi, Tokyo (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 144 days.

(21) Appl. No.: 14/614,587

(22) Filed: Feb. 5, 2015

(65) Prior Publication Data

US 2015/0228064 A1 Aug. 13, 2015

(30) Foreign Application Priority Data

Feb. 7, 2014 (JP) .................................. 2014-21814

(51) Int. Cl.
*G06K 9/00* (2006.01)
*G06T 7/73* (2017.01)

(52) U.S. Cl.
CPC ...... *G06T 7/75* (2017.01); *G06T 2207/10028* (2013.01); *G06T 2207/30108* (2013.01); *G06T 2207/30248* (2013.01)

(58) Field of Classification Search
None
See application file for complete search history.

(56) References Cited

U.S. PATENT DOCUMENTS

| 6,966,525 | B1 * | 11/2005 | Schroeder | B64D 39/00 244/135 A |
| 7,693,617 | B2 * | 4/2010 | Dockter | B63B 35/50 244/158.4 |
| 9,098,890 | B2 * | 8/2015 | Lee | G06T 7/0004 |
| 9,274,529 | B2 * | 3/2016 | Ben-Shachar | G05D 1/0676 |

(Continued)

FOREIGN PATENT DOCUMENTS

| JP | 2010540933 | 12/2010 |
| JP | 2012526979 | 11/2012 |
| JP | 2013-014152 A | 1/2013 |

OTHER PUBLICATIONS

Japanese Office Action for Japanese Patent Application No. 2014-021814 dated Aug. 8, 2017.

*Primary Examiner* — Tahmina Ansari
(74) *Attorney, Agent, or Firm* — Pearne & Gordon LLP

(57) ABSTRACT

To provide a structure maintenance supporting system that can accurately and quickly associate any position on a structure with a position in the drawing of the structure that is referred to at the time of maintenance. A maintenance supporting system includes an image displaying device that displays an image of a structure to be referred to when any damaged position on the structure is maintained, and a processing unit that performs calculation to associate the damaged position with a position in the image. The processing unit includes a damaged position calculating section that calculates a target coordinate which is the coordinate of the damaged position using known coordinates given to a plurality of reference points, and a position specifying section that specifies a position in the image corresponding to the target coordinate with an indication on the image displaying device.

17 Claims, 10 Drawing Sheets

(56) References Cited

U.S. PATENT DOCUMENTS

| | | | |
|---|---|---|---|
| 9,448,758 B2* | 9/2016 | Georgeson | G06F 3/1454 |
| 2009/0086014 A1 | 4/2009 | Lee et al. | |
| 2009/0138138 A1* | 5/2009 | Ferren | G01C 23/00 |
| | | | 701/3 |
| 2011/0235871 A1* | 9/2011 | Byren | G06K 9/2036 |
| | | | 382/124 |
| 2012/0140041 A1 | 6/2012 | Burgunder et al. | |
| 2014/0022281 A1 | 1/2014 | Georgeson et al. | |
| 2015/0138330 A1* | 5/2015 | Krishnamoorthi | G06T 7/0016 |
| | | | 348/77 |
| 2015/0228064 A1* | 8/2015 | Suhara | G06T 7/0046 |
| | | | 382/103 |

* cited by examiner

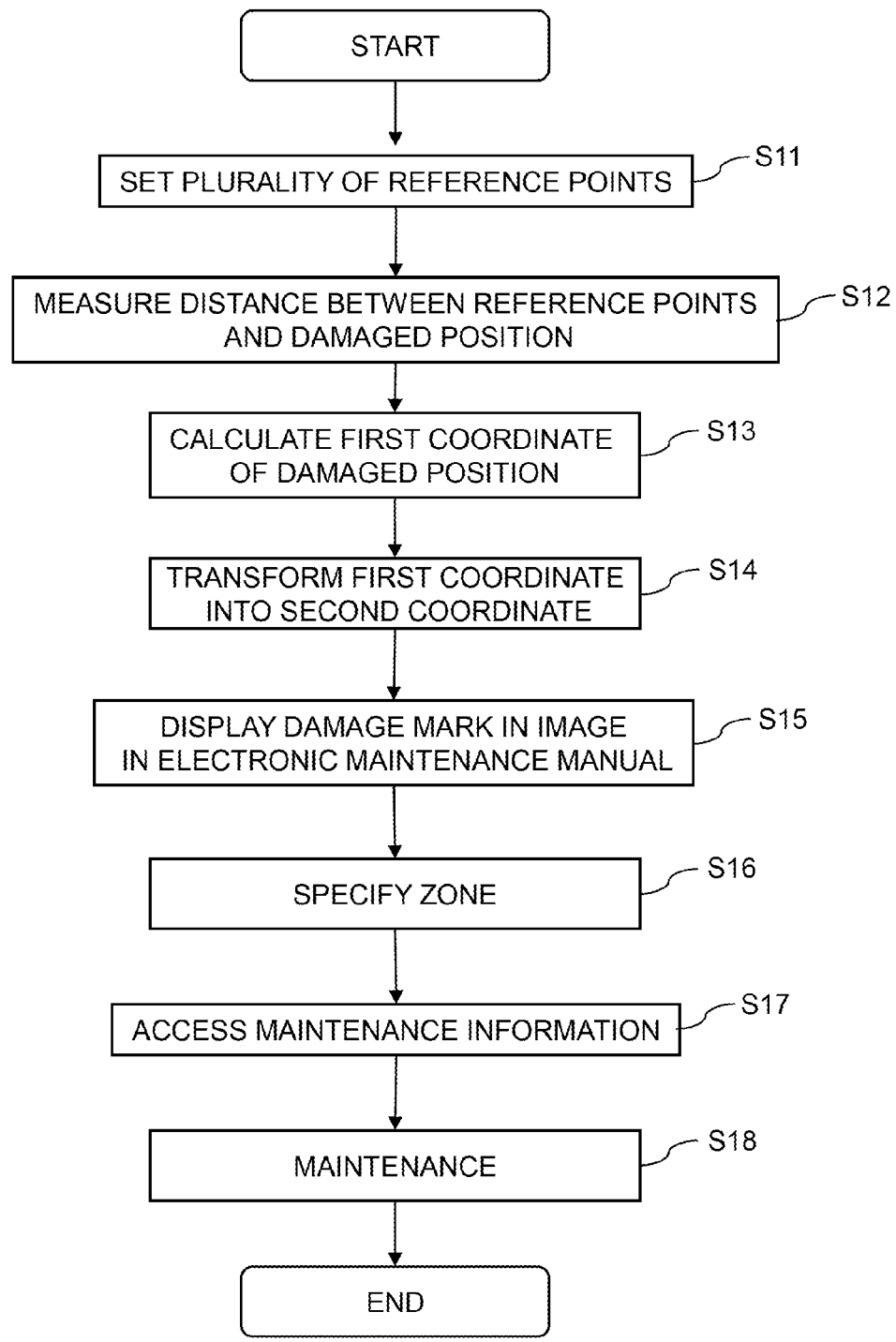

MAINTENANCE SUPPORTING SYSTEM AND MAINTENANCE SUPPORTING METHOD UTILIZING A REFERENCE IMAGE AND INDICATOR

BACKGROUND OF THE INVENTION

Field of the Invention

The present invention relates to a maintenance supporting system and a maintenance supporting method that are applicable to structures such as an aircraft.

Description of the Related Art

In airlines, it is desirable that, when an aircraft is damaged due to a collision with a bird or a strike of lightning, appropriate maintenance is quickly performed to return the aircraft to service.

Information on maintenance of an aircraft has a very large volume, and thus systems that support the maintenance of aircrafts using databases have been proposed (e.g., Japanese Patent Laid-Open No. 2013-14152).

The maintenance of an aircraft is performed according to a maintenance manual. With the maintenance manual, maintenance information such as the necessity of repair and an applicable repair method is given in accordance with the form of damage, a damaged portion, the size of damage, and the like.

The damaged portion is minutely classified into, in the body of the aircraft, for example, a large grouping including a main wing, a vertical fin, a horizontal tail, the front side of a fuselage, and the rear side of the fuselage, a middle grouping in the large grouping including an upper portion, a lower portion, a left edge, a right edge, a front spar, and a rear spar, and further a small grouping representing more specific regions. The maintenance information is prepared for each these subdivided parts, and thus identifying which part the damage is positioned is needed.

Here, the maintenance manual has drawings on which boundary lines are drawn between the parts, but an actual aircraft body normally has no mark or the like indicating the boundaries, for the sake of appearance.

As a result, it is determined that the position of damage substantially corresponds to which position in a drawing in the maintenance manual using, for example, the position of a predetermined fastener as a guide selected from a large number of fasteners provided on the aircraft body, which is however not accurate.

Unfortunately, it takes a lot of time only to select the fastener.

In addition, in the case of an aircraft-body structure formed by fiber reinforced resin, the number of fasteners in use is small because the parts of the aircraft-body structure are bonded together. In such a case, no fastener as a guide of the damaged position may be present.

The present invention has been made based on the above-described problems, and has an object to accurately and quickly associate any position on a structure with a position in a drawing of the structure that is referred to at the time of maintenance.

SUMMARY OF THE INVENTION

A maintenance supporting system of the present invention includes an image displaying device that displays a reference image of a structure to be referred to when any target position on the structure is maintained, and a processing unit that performs calculation to associate the position on the structure with a position in the reference image.

In the present invention, the processing unit includes a coordinate calculating section that calculates a target coordinate which is a coordinate of the target position using known coordinates given to a plurality of reference points, and a position specifying section that specifies a position in the reference image corresponding to the target coordinate, with an indication on the image displaying device.

In the present invention, the target position on the structure is associated with the position in a reference image (e.g. drawing) by calculating the coordinate of the target position (target coordinate) to be maintained, with the processing unit, and further specifying a position corresponding to the target coordinate in the reference image to be referred to at the time of maintenance, with an indication (e.g., symbol, character, mark, or point) on the image displaying device.

This enables accurate and quick specification of the position in the reference image corresponding to the target position, the position that is hard to find only by comparing the structure with the reference image. It is thus possible to quickly perform appropriate maintenance based on maintenance information provided in the reference image for each part of the structure.

The term "maintenance" in the present invention refers to measures and actions necessary for the maintenance and management of a structure as a whole, such as repair, check, inspection, confirmation, and recording, and is not necessarily accompanied by repairs.

In the maintenance supporting system of the present invention, the coordinate calculating section preferably calculates the target coordinate using, in addition to the known coordinate, a plurality of captured image that are obtained by capturing the target position and the plurality of reference points from different positions.

This allows for making use of known image processing to perform geometrical association between the target position and the reference points in data on the captured images, analysis by scanning, pattern matching, filtering, and the like, which makes it possible to calculate the target coordinate of the target position without measuring the distances and the angles between the target position and the reference points.

The captured images can be obtained by an inexpensive multi-purpose digital camera, which enables reducing the cost necessary for building the system.

In the maintenance supporting system of the present invention, individually identifiable markings preferably provided on the structure at the target position and the reference points.

Providing the markings allows for enhancing the precision of the image processing, and it is thus possible to accurately specify a position corresponding to the target position in the reference image.

In the maintenance supporting system of the present invention, the target coordinate can be calculated using, in addition to the known coordinates, the distances between the plurality of reference points and the target position.

To measure the distances between the target position and the reference points, any range-finding devices such as laser rangefinders and rangefinders making use of ultrasonic radar and millimeter-wave radar can be used.

In the case where an object to be maintained is a large structure such as a road and a stadium, range-finding devices making use of GNSS (Global Navigation Satellite System) such as GPS (Global Positioning System) can be used.

When the distances between the three reference points and the target position are calculated, the space coordinate of the target position, which is an intersection (point) of lines connecting the reference points and the target position, is uniquely determined, which allows for calculating the space coordinate of the target position (target coordinate).

In addition, the space coordinate of the target position can be calculated also using the distances between two reference points and the target position, the distance calculated from the known coordinates of the two reference points.

In the maintenance supporting system of the present invention, to measure the distances, a range-finding device that makes use of reflection of light is used.

As such a range-finding device, a laser rangefinder that can measure a distance with high precision using the straightness of laser light can be preferably used.

In the maintenance supporting system of the present invention, when a plurality of regions are set in the reference image to members making up the structure, a region to which the position corresponding to the target coordinate belongs may be specified from among the plurality of regions by the position specifying section with an indication on the image displaying device.

When information necessary for the maintenance is provided for each region, it is sufficient to specify the region to which the target position belongs with an indication having a color or pattern different from that of the other regions.

The target position belonging to the region can be naturally specified with the indication together with the specification of the region.

As described above, specifying the region with the indication allows for reliably confirming the region to which the target position belongs from the screen of the image displaying device.

In maintenance supporting system of the present invention, the processing unit preferably includes a maintenance history storing section that saves maintenance history data in which the target coordinate is associated with the reference image, in a memory, and a maintenance history displaying section that, if any associated maintenance history data is present when the reference image is referred to, specifies the position corresponding to the target coordinate contained in the maintenance history data, in the reference image.

This allows for grasping portions that have been maintained in the reference image without omission, which helping observe restrictions, regulations, and the like on a re-repair of the vicinity of a portion having a maintenance history.

The maintenance supporting system of the present invention can include a coordinate transforming section that transforms the target coordinate into a reference coordinate indicating a position corresponding to the target coordinate in a form of a coordinate in a coordinate system given to the reference image.

In this case, the position specifying section specifies the position in the reference image corresponding to the target coordinate, with an indication on the image displaying device.

In the maintenance supporting system of the present invention, maintenance information is preferably displayed, which corresponds to the position that is specified by the position specifying section on the image displaying device.

Displaying the maintenance information corresponding to the specified position is on a screen, allows for quickly performing maintenance operation without searching for the maintenance information corresponding to the specified position.

The maintenance supporting system of the present invention, the processing unit is preferably included in a portable computer, and the coordinate calculating section, and the coordinate transforming section and the position specifying section are preferably included in a program of software provided in the computer.

When a maintenance-required portion such as damage (target position) is found on the structure, carrying about the portable computer near the structure allows for quickly starting position specifying operation of the maintenance-required portion.

In addition, when the position of the maintenance-required portion is specified in the reference image, carrying about the computer near the structure allows for making sure that the target position in the reference image on the screen corresponds to an actual target position on the structure.

In the maintenance supporting system of the present invention, the software preferably contains an electronic maintenance manual that provides information necessary for maintenance, and the reference image is contained in the electronic maintenance manual.

Configuring the above-described coordinate calculating section, coordinate transforming section, and position specifying section are in the form of the same software as that of the electronic maintenance manual in which characters, drawings, and the like in the maintenance manual necessary for maintenance are digitized enables providing a user-friendly system.

The maintenance supporting system of the present invention is preferably applied to the structure of an aircraft.

In airlines, unexpected maintenance taking a lot of time causes a great deal of damage, and thus quickly specifying a maintenance-required portion and promptly finishing the maintenance have a beneficial effect.

The computer program of the present invention includes the above-described coordinate calculating section, coordinate transforming section, and position specifying section.

The coordinate calculating section, the coordinate transforming section, and the position specifying section allows for accurately and quickly associating the target position on the structure and the position in the reference image. It is thus possible to perform appropriate maintenance based on maintenance information provided in the reference image for each part of the structure.

In addition, software including the computer program makes its distribution easy.

A maintenance supporting method of the present invention using a processing unit that performs calculation to associate a position in a reference image of a structure to be referred to when any target position on the structure is maintained with the position on the structure, includes a coordinate calculating step of calculating a target coordinate which is a coordinate of the target position using known coordinates given to a plurality of reference points, and a position specifying step of specifying a position in the reference image corresponding to the target coordinate.

In the present invention, the target position on the structure is accurately and quickly associated with the position in the reference image by calculating the coordinate of the target position (target coordinate) to be maintained, and specifying a position in the reference image corresponding to the target coordinate with an indication on the image displaying device.

It is thus possible to quickly perform appropriate maintenance based on the maintenance information provided in the reference image for each part of the structure.

The maintenance supporting method of the present invention preferably includes a target disposing step of disposing targets which light emitted from the target position enters, at the plurality of reference points, and a range-finding step of measuring distances between the plurality of reference points and the target position, wherein in the coordinate calculating step, the target coordinate is preferably calculated using the distances in addition to the known coordinates.

Disposing the targets allows for enhancing the measurement precision of the distances.

In addition, since the light is emitted from the range-finding device disposed at the target position to the targets disposed at the reference points, the distances to the reference points can be measured only by changing the orientation of the range-finding device at the target position, unlike the case where the position relationship between the range-finding device and the targets is reversed as compared with this case.

As a range-finding device, a laser rangefinder that can measure a distance with high precision using the straightness of laser light can be preferably used.

The maintenance supporting method of the present invention can include a coordinate transforming step of transforming the target coordinate into a reference coordinate which is a coordinate in a coordinate system given to the reference image.

In this case, in the position specifying step, the position in the reference image corresponding to the target coordinate can be specified with an indication.

The maintenance supporting method of the present invention is preferably applied to the structure of an aircraft.

The maintenance method of the present invention including the above-described maintenance supporting method, includes a maintenance information accessing step of accessing maintenance information corresponding to the position that is specified in the position specifying step, and a maintaining step of taking measures based on the maintenance information.

According to the present invention, since a position on a structure is accurately and quickly associated with a position in a reference image, it is possible to take appropriate measures according to maintenance information that is instructed for each position on the structure, resulting in the prompt finish of maintenance.

The present invention can provide a maintenance supporting system that can accurately and quickly associate any position on a structure with a position in the drawing or the like (reference image) of the structure that is referred to at the time of maintenance, a computer program, a maintenance supporting method, and a maintenance method.

BRIEF DESCRIPTION OF THE DRAWINGS

FIG. 3 is a flow chart showing a procedure of processing to associate a damaged position on the vertical fin with an image in the electronic maintenance manual and to display the damaged position;

DETAILED DESCRIPTION OF THE PREFERRED EMBODIMENTS

Embodiments of the present invention will be described below with reference to the drawings.

First Embodiment

Figure 1:
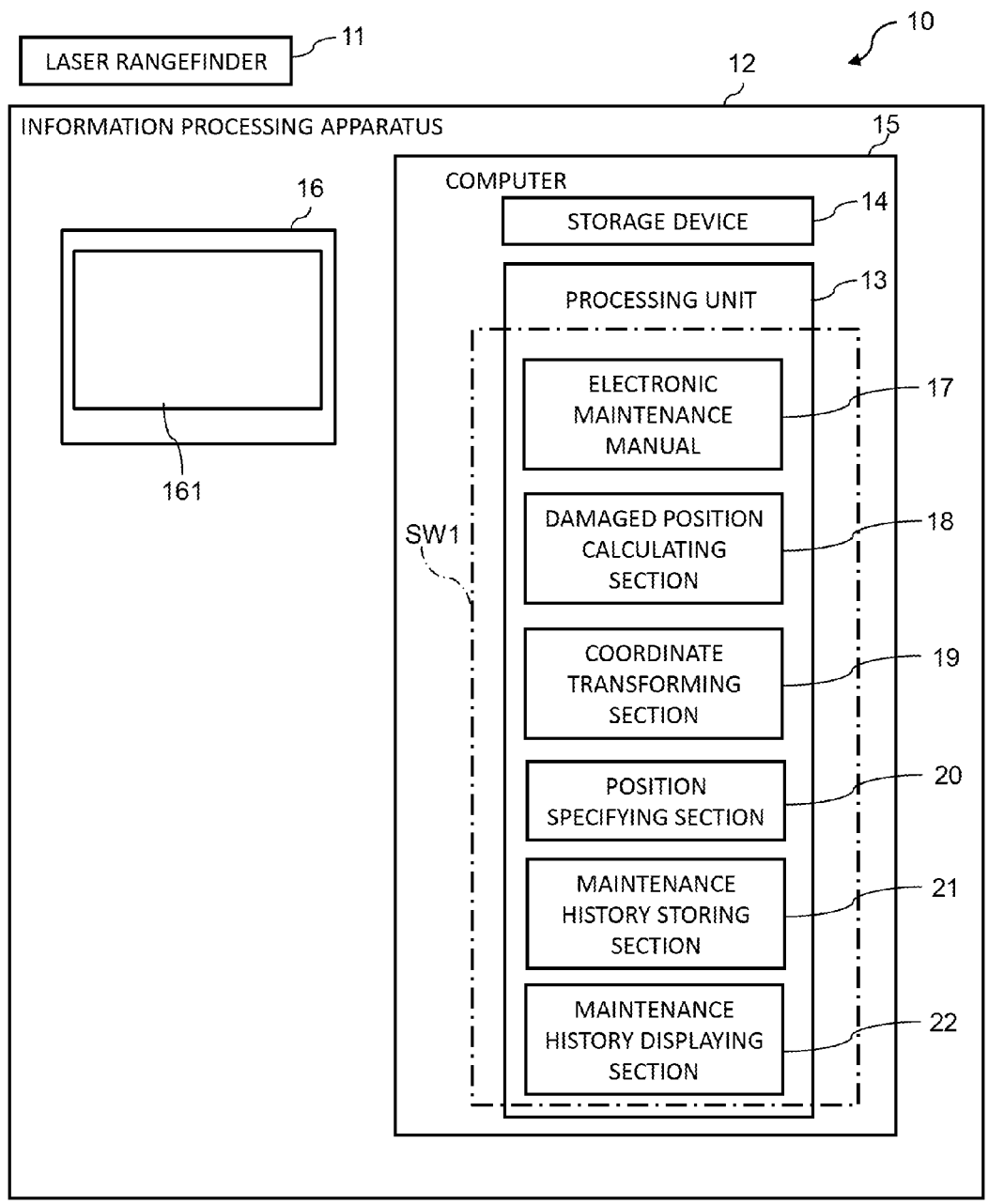
FIG. 1 is a block diagram showing a maintenance supporting system for an aircraft according to a first embodiment of the present invention.

A maintenance supporting system 10 shown in FIG. 1 has a function of associating any position in the aircraft body of an aircraft with an image (drawing) in an electronic maintenance manual that is referred to at the time of maintenance.

The maintenance supporting system 10 includes a laser rangefinder 11 that measures the distances between a position on the aircraft body that needs maintenance due to damage or the like (hereafter, referred to as a damaged position) and three reference points on the aircraft body, the sets of space coordinates of which are known, and an information processing apparatus 12 that calculates the coordinates of the damaged position using the distances measured by the laser rangefinder 11, and associates the coordinates with a coordinate system of an image in an electronic maintenance manual 17.

The laser rangefinder 11 measures a distance from an emitting position to a reflecting position based on the correlation between an emitted laser beam and the laser beam returned by reflection.

The laser rangefinder 11 is disposed at a damaged position on the aircraft body to identify the damaged position. The laser rangefinder 11 emits laser beams toward targets disposed at the three reference points, and the laser beams reflect off the targets, respectively.

The information processing apparatus 12 is of a portable type that includes a computer 15 and an image displaying device 16, which is integrated with the computer 15, having a screen 161 on which information is displayed by the computer 15. The information processing apparatus 12 can accept input operations with a keyboard or a pen, or by touching on the screen 161 of the image displaying device 16.

The computer 15 includes a processing unit 13 such as a CPU (Central Processing Unit), and a storage device 14 freely formed by a semiconductor memory, a magnetic disk, an optical disk, or the like.

The computer 15 is provided with maintenance software SW1. The computer program of the maintenance software SW1 is loaded and executed by the processing unit 13.

The computer program of the maintenance software SW1 includes the electronic maintenance manual 17, a damaged position calculating section 18, a coordinate transforming section 19, and a position specifying section 20; besides a maintenance history storing section 21 and a maintenance history displaying section 22, which will be described hereafter.

The electronic maintenance manual 17 is made by digitizing character information, charts, and the like necessary for the maintenance of an aircraft.

The damaged position calculating section 18 calculates the space coordinates of a damaged position using the distances measured by the laser rangefinder 11 and the sets of known coordinates of the reference points on the aircraft body.

The coordinate transforming section 19 transforms the space coordinate of the damaged position (target coordinate) into a plane coordinate (reference coordinate) in a coordinate system given to an image in the electronic maintenance manual 17.

The electronic maintenance manual 17 contains a large number of images that depict parts of the aircraft from different angles. Every image has an assigned ID (identification). In addition, every image is given a plane coordinate system that is orthogonal to a line of sight toward the aircraft body.

The position specifying section 20 displays marks at positions corresponding to the above sets of reference coordinates obtained by the coordinate transforming section 19, on an image in the electronic maintenance manual 17.

Figure 2A:
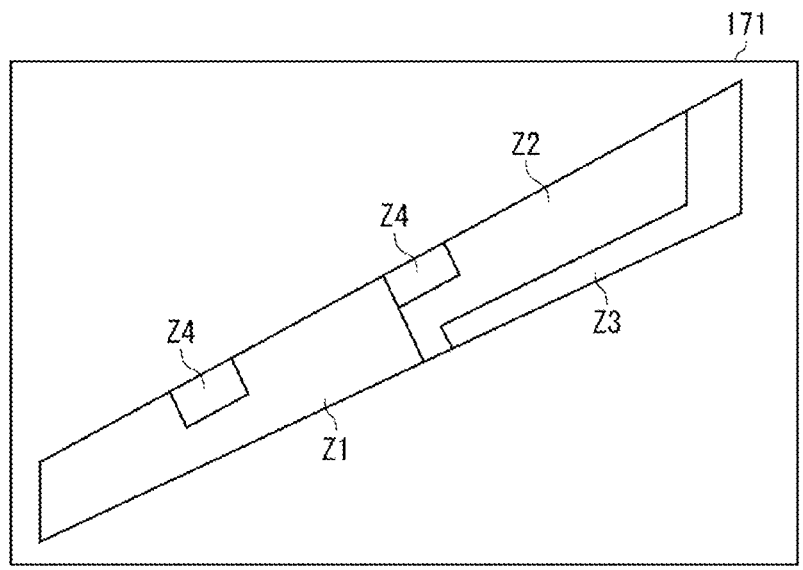
FIG. 2A shows an example of an image in an electronic maintenance manual.

The above-described electronic maintenance manual 17 is displayed on the screen 161 of the image displaying device 16 of the information processing apparatus 12. An example of an image contained in the electronic maintenance manual 17 is an image 171 shown in FIG. 2A.

The image 171 depicts a plurality of regions (zone Z1 to zones Z4) that are set between the spars of a vertical fin. The zones Z1 to Z4 are separated by boundary lines in the image 171. To each of these zones Z1 to Z4, different piece of maintenance information is given.

Figure 2B:
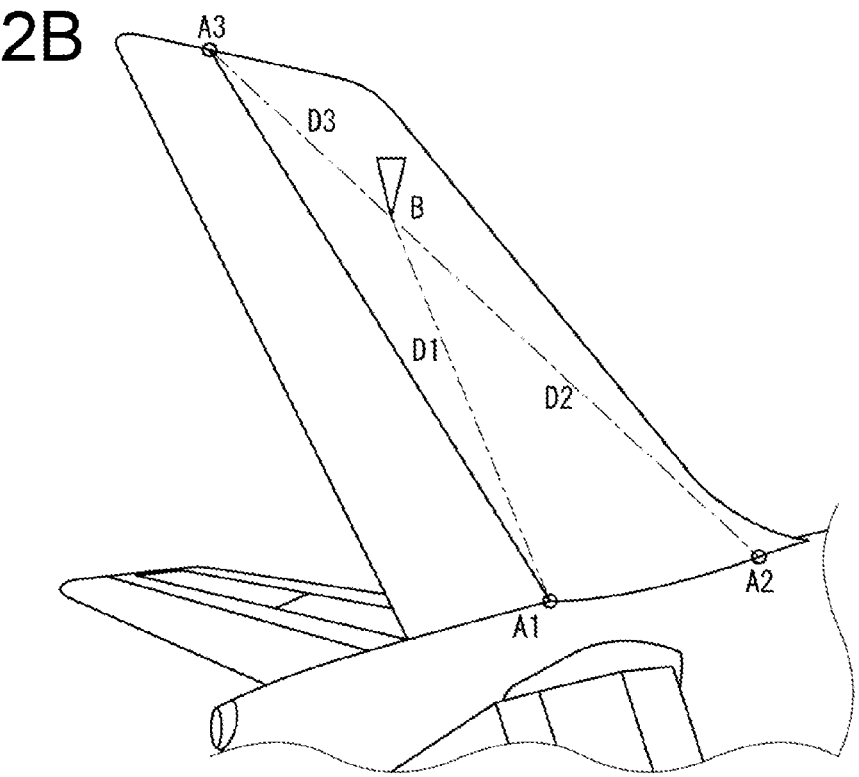
FIG. 2B is a diagram showing a vertical fin as an example of a structure in which damage occurs.

Here, the vertical fin of an actual aircraft body (FIG. 2B) has no boundary lines to separate the zones Z1 to Z4 or marks, and it is thus difficult to identify which position in the image 171 in the electronic maintenance manual 17 a given position on the aircraft body requiring maintenance corresponds to and which zone the given position belongs to.

There are a method of using the position of a fastener exposed on the surface of the vertical fin as a criterion, and a method of measuring a distance from an edge of the vertical fin, although they unfortunately lack a particular precision, have a risk of making a mistake, and take a lot of time and efforts.

For this reason, in the present embodiment, as will be described below, a given position on the aircraft body is mapped on (associated with a position on) an image in the maintenance manual using the maintenance supporting system 10.

A maintenance method using the maintenance supporting system 10 of the present embodiment will be described.

When any damage is found on the aircraft body in the maintenance or check of the aircraft, the state of the damage is checked through visual inspection or ultrasonic flaw inspection, and the size of the damage is measured. Then, it is needed to specify the position of the damage (a damaged position B) in the image 171 in the electronic maintenance manual 17 to obtain the maintenance information.

If the damage has a wide area, two or more damaged positions B can be set for one damaged portion.

There will be described below a process to associate the damaged position B with a position in the image 171 in the electronic maintenance manual 17 with reference to FIG. 3, taking damage between the spars (FIG. 2B) of the vertical fin as an example.

As advance preparations, a first reference point A1, a second reference point A2, and a third reference point A3, which are the three reference points used to calculate the space coordinate of the damaged position B (target coordinate), are set on the aircraft body (reference point setting step S11). These reference points each have a known space coordinate in the identical space orthogonal coordinate system.

All the first to third reference points A1 to A3 are positioned in a range within which laser beams emitted from the damaged position B can reach. On each of these first to third reference points A1 to A3, a target (e.g., reflecting plate) which the laser beam emitted from the laser rangefinder 11 enters is detachably disposed.

The first to third reference points A1 to A3 given the known space coordinates are also known in a plane orthogonal coordinate system that is given to the image 171 (reference image) in the electronic maintenance manual 17 corresponding to between the spars of the vertical fin where the three reference points are set. That is, the plane coordinates of a first reference point A1', a second reference point A2', and a third reference point A3' in the image 171 corresponding to the respective space coordinates of the first reference point A1, the second reference point A2, the third reference point A3 are specified.

The coordinate transforming section 19 of the information processing apparatus 12 derives a mapping function F to transform the space coordinate of the respective first to third reference points A1 to A3 into the plane coordinates of the respective first to third reference point A1' to A3' in the image 171.

The storage device 14 of the information processing apparatus 12 stores the space coordinate of the respective first to third reference points A1 to A3, and the mapping function F.

Next, the laser rangefinder 11 is disposed at the damaged position B, and a laser beam is emitted from the laser rangefinder 11 to the target on the first reference point A1, to measure a distance D1 between the first reference point A1 and the damaged position B. Similarly, a distance D2 between the second reference point A2 and the damaged position B, and a distance D3 between the third reference point A3 and the damaged position B are also measured (the above is range-finding step S12).

When the measurement of the distances D1 to D3 is finished, the targets are detached from first to third reference points A1 to A3.

The data on the measured distance D1, distance D2, and distance D3 is input into the information processing apparatus 12 from the laser rangefinder 11 via a cable, a memory card, or the like, and delivered to the damaged position calculating section 18.

Alternatively, inputting the values of the distance D1, distance D2, and distance D3 on an input screen that is prepared as a module of the program in the maintenance software SW1 delivers the data on the distance D1, distance D2, and distance D3 to the damaged position calculating section 18.

Next, the damaged position calculating section 18 calculates the space coordinate of the damaged position B (target coordinate) using the distances D1 to D3 between the first to third reference points A1 to A3 and the damaged position B, and the space coordinates of the respective first to third reference points A1 to A3 that are read from the storage device 14 (coordinate calculation step S13).

When the distances D1 to D3 between the three reference points A1 to A3 (known points) and the damaged position B (point to be measured) are calculated, the space coordinate of the damaged position B, which is an intersection (point) of lines connecting the reference points and the damaged position, is uniquely determined, and thus using the distances D1 to D3 and the space coordinates of the respective first to third reference points A1 to A3 allows for calculating the target coordinate of the damaged position B.

Note that the other solutions may also calculate the target coordinate of the damaged position B. Specific methods of calculating the target coordinate of the damaged position B is not limited.

When the space coordinate of the damaged position B is calculated through the above steps, the coordinate transforming section 19 provides the target coordinate of the damaged position B on the aircraft body to the mapping function F, whereupon the reference coordinate in the image 171 in the electronic maintenance manual 17 is calculated. In such a manner, the target coordinate (x, y, z) of the damaged position B is transformed into the reference coordinate (X, Y) in the image 171 (coordinate transforming step S14).

Next, the position specifying section 20 takes in the data on the image 171, superimposes mark display on the image 171 at the position corresponding to the reference coordinate, and displays the superimposed image on the screen 161 of the image displaying device 16 (mark image displaying step S15).

Figure 4A:
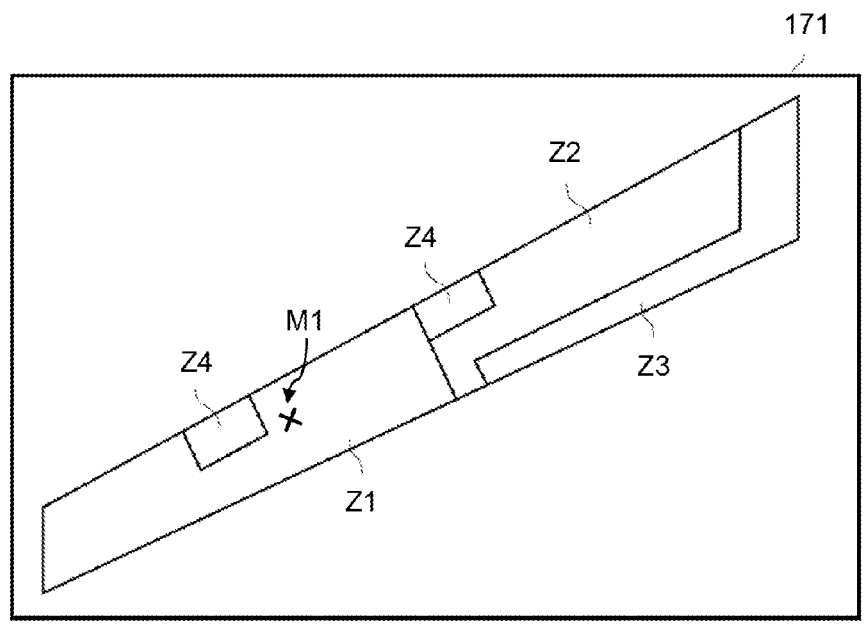
FIG. 4A shows an image in the electronic maintenance manual with a mark indicating the damaged position.

For example, as shown in FIG. 4A, the image 171 with a mark display M1 is displayed on the screen 161. This mark display M1 allows the position corresponding to the damaged position B to be specified in the image 171.

The mark display M1 may be a sign, character, point, or image in any form.

According to the above steps, by performing the coordinate calculating process, the coordinate transforming process, and the mark displaying process with the information processing apparatus 12 using the distances D1 to D3 from the damaged position B to the first to third reference points A1 to A3 measured by the laser rangefinder 11, the mark display M1 indicating the damaged position B is displayed in the image 171 in the electronic maintenance manual 17, being associated with the position corresponding to the damaged position B.

At this point, carrying about the information processing apparatus 12 near the damaged position B of the aircraft body allows for making sure that the position of the mark display M1 on the screen 161 corresponds to an actual damaged position B on the aircraft body.

According to the present embodiment, the damaged position B on the aircraft body is accurately associated with a position in the image 171 in the electronic maintenance manual 17 through automatic computation, which clearly indicates a zone among the plurality of zones Z1 to Z4 shown by the image 171 in the electronic maintenance manual 17, in which the damaged position B is positioned, allowing for correctly specifying a zone to which the damaged position B belongs (zone specifying step S16).

This enables accessing maintenance information, such as the necessity of repair and an applicable repair method, which is defined by, for example, the state of damage that is classified into surface damage, delamination, missing of layer, and the like, the size of the damage, and a region such as the zones Z1 to Z4. For example, referring to a table showing the maintenance information in the electronic maintenance manual 17 (maintenance information accessing step S17) allows appropriate measures to be taken based on the maintenance information (maintaining step S18).

Furthermore, a convenient manner is to save a piece of maintenance information for each zone in a memory, and read a piece of maintenance information corresponding to the zone of damage specified on the screen 161 from the memory and display the piece of maintenance information on the same screen 161. This allows for quickly performing maintenance operation without searching for the maintenance information.

Here, assuming that damage needs no repair, that is, the damage is bearable, if any repair has been made at the position or in the vicinity of the damage, the other repair may be needed depending on the state or the size of the damage that was repaired at that time. In addition, there is a case where repairing damage at the first time is appropriate but a re-repair performed on the same position or the vicinity thereof is restricted.

For these reasons, the computer program in the maintenance software SW1 loaded in the processing unit 13 preferably contains the maintenance history storing section 21 and the maintenance history displaying section 22.

The maintenance history storing section 21 saves maintenance history data in which the reference coordinate corresponding to the damaged position B in the image 171, the state of the damage, the size of the damage, whether a repair has been made, and the like with the image 171, in the storage device 14.

When the image 171 in the electronic maintenance manual 17, including a position with respect to which a maintenance history is present, is referred to, the maintenance history displaying section 22 specifies a position corresponding to a reference coordinate contained in the maintenance history data read from the storage device 14, in the image 171.

Figure 4B:
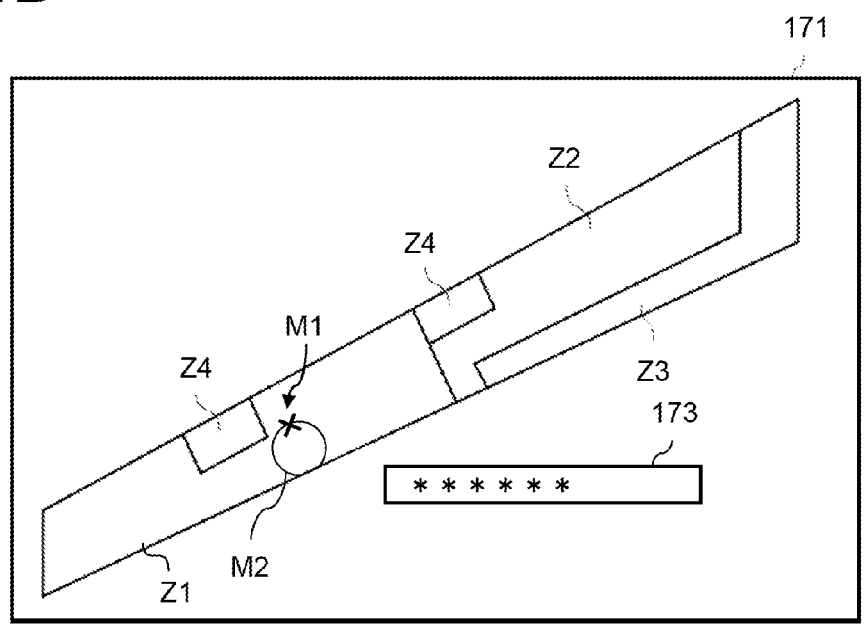
FIG. 4B shows a diagram of the electronic maintenance manual in which a damaged position contained in maintenance history data is specified.

Specifically, the maintenance history displaying section 22 displays, as shown in FIG. 4B, image data combined with a history mark display M2 that indicates a predetermined range around the reference coordinate contained in the maintenance history data, on the screen 161.

This allows for grasping portions, without omission, that have been maintained in the same member of the damaged position B which is an object to be maintained of this time, based on the history mark display M2. It is therefore possible to take appropriate measures of, for example, repairing damage even if the damage is bearable when, for example, the mark display M1 indicating the damage overlaps with the history mark display M2, avoiding a re-repair of damage necessary to repair and replacing the damaged portion with a new item, or the like, helping observe the maintenance regulations.

Here, a convenience manner is to cause the maintenance history displaying section 22 to display the history mark display M2, together with information 173 indicating maintenance requirements such as the restriction on a re-repair, and the past repair dates on the screen 161, which allows for grasping the maintenance requirements without checking the corresponding portion in another document or the electronic maintenance manual 17 on which the maintenance history is written. Note that clicking or touching the history mark display M2 may display the corresponding portion in the electronic maintenance manual 17 indicating the maintenance requirements to be displayed.

The maintenance history data can be transmitted from the information processing apparatus 12 to the external storage device (e.g., a storage device in a server) and saved. If a plurality of information processing apparatuses 12 are used to maintain the same aircraft, it is desirable that the maintenance history data is collectively managed in the external storage device, and the information processing apparatuses 12 shares the same maintenance history data.

According to the present embodiment, as described above, the damaged position B on the aircraft body is accurately and quickly associated with the position in the image 171 in the electronic maintenance manual 17 by the automatic computation, and it is thus possible to immediately start the maintenance of the damaged position B without taking a lot of time and effort to specify the position of the damaged position B in the image 171 and to promptly finish the maintenance. The aircraft can therefore be immediately returned to service.

The above description has been made taking the damage between the spars of the vertical fin as an example, and when damage is found in the other part of the aircraft body, the first to third reference points (space coordinates) set to the other part are to be used.

The aircraft body of an aircraft can be divided into a plurality of parts such as the upper portion of a main wing, the lower portion of the main wing, the front side of the fuselage, the rear side of the fuselage, and a horizontal tail, such that laser beams can reach all the first to third reference points.

Then, by setting a plurality of sets of the first to third reference points for respective parts, the position of damage can be associated with a position in the image 171 in the electronic maintenance manual 17, whichever part the damage occurs.

[Modification of First Embodiment]

In the above-described first embodiment, the distances from the damaged position B to the three reference points A1 to A3 are measured, and the space coordinate of the damaged position B can be calculated with a known method of resection, using the measurements of distances and azimuth angles from the damaged position B to any two reference points.

In addition, four or more reference points may be used. This has an advantage in reducing a measurement error because a large sample size levels off accidental errors and the like and reduces the variation.

Figure 5:
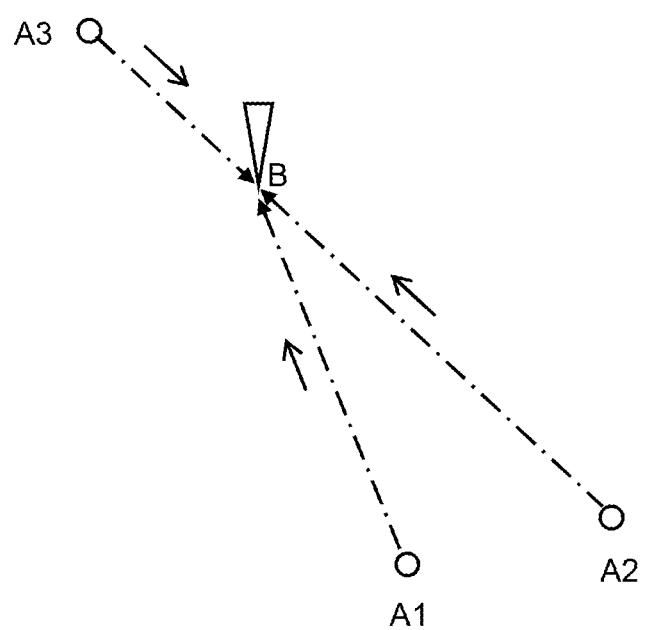
FIG. 5 is a diagram showing a modification of the first embodiment.

Furthermore, contrary to the first embodiment, the space coordinate of the damaged position B can be also calculated by setting a target at the damaged position B and disposing the laser rangefinders 11 at the first to third reference points A1 to A3, and as shown in FIG. 5, measuring the distances D1 to D3 from the first to third reference points A1 to A3 to the damaged position B, through the calculation similar to that of the first embodiment.

In addition, the space coordinate of the damaged position B can be calculated also with a technique of triangulation, in which the distances between two reference points and interior angles at the two reference point are measured to determine a triangle.

Second Embodiment

Figure 6:
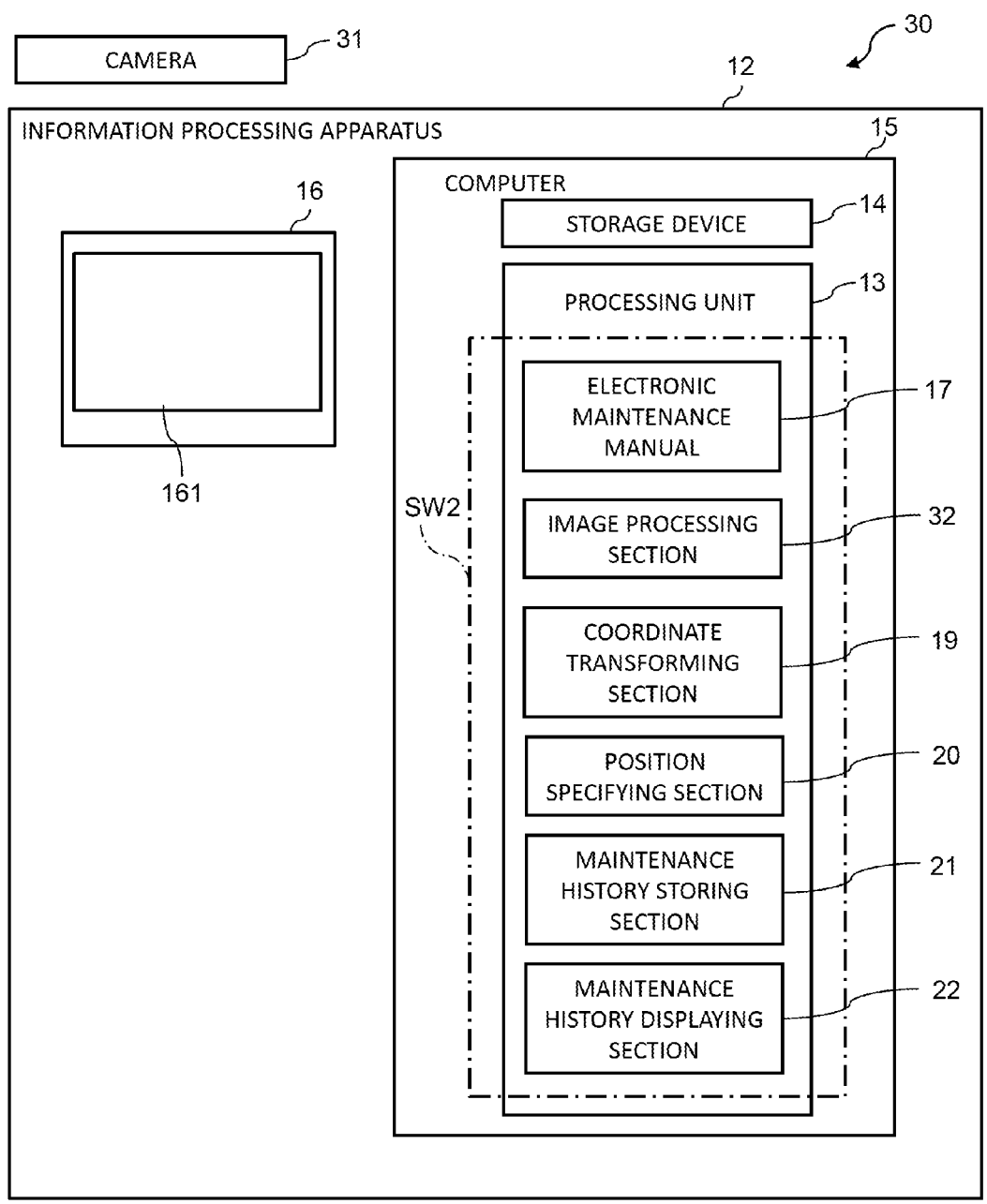
FIG. 6 is a block diagram showing a maintenance supporting system according to a second embodiment of the present invention.

Next, a second embodiment of the present invention will be described with reference to FIG. 6.

In the second embodiment, the damaged position B on the aircraft body of an aircraft is associated with a position in the electronic maintenance manual 17 through image processing using data on an image that is obtained by capturing a range including the damaged position B and the first to third reference points A1 to A3.

The description will be made below focusing on points different from those of the first embodiment. Configurations similar to those of the first embodiment will be denoted by the same reference numerals.

A maintenance supporting system 30 of the second embodiment includes a camera 31, and an information processing apparatus 12 that takes in data on an image captured by the camera 31 and uses the data in the image processing.

The camera 31 is a digital camera, and captures the range including the damaged position B of the aircraft body and the first to third reference points A1 to A3 to generate image data.

The information processing apparatus 12 takes in the image data of the camera 31 through wired/wireless communication between the camera 31 and the information processing apparatus 12, or via a memory card that stores the image data.

In the present embodiment, the range including the damaged position B and the first to third reference points are captured by the camera 31 from different capturing positions, to obtain two images.

Note that obtaining three or more images levels off accidental errors and the like and reduces the variation, which has an advantage in reducing a measurement error.

The information processing apparatus 12 is provided with maintenance software SW2. The computer program of the maintenance software SW2 is loaded and executed by the processing unit 13.

The maintenance software SW2 includes the electronic maintenance manual 17, an image processing section 32, the coordinate transforming section 19, the position specifying section 20, the maintenance history storing section 21, and the maintenance history displaying section 22.

The image processing section 32 calculates the space coordinate of the damaged position B (target coordinate) by manipulating the data on the images taken in from the camera 31 to perform the image processing.

A maintenance method using the maintenance supporting system 30 of the present embodiment will be described.

Figure 7:
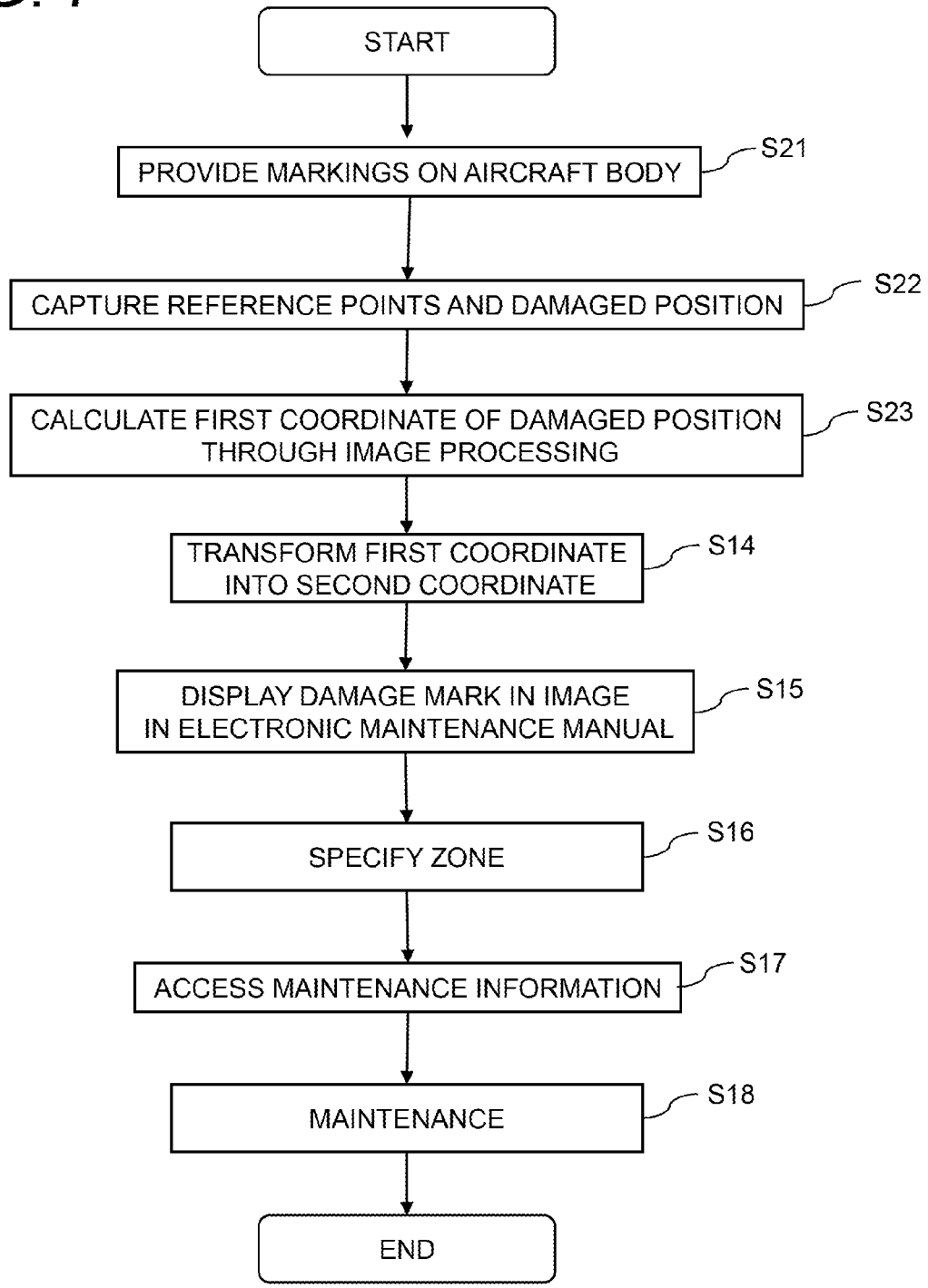
FIG. 7 is a flow chart showing a procedure of processing to associate a damaged position with an image in the electronic maintenance manual.

Also in the present embodiment, taking the damage between the spars of the vertical fin (FIG. 2B) as an example, the process to associate the position of the damage (damaged position B) with the position in the image 171 in the electronic maintenance manual 17 will be described below with reference to FIG. 7.

As advance preparations, the damaged position B, and the first reference point A1, the second reference point A2, and the third reference point A3, which are the three reference points used to calculate the target coordinate of the damaged position B, are marked on the aircraft body (aircraft body marking step S21).

All the first to third reference points A1 to A3 are positioned in a range within which they can be captured together with the damaged position B in one image at one time.

The marking can be performed by, for example, attaching stickers on the aircraft body.

In addition, the marking provided to the damaged position B and the first to third reference points A1 to A3 are each encoded into a number or symbol, a one-dimensional code such as a bar code, a two-dimensional code such as a QR code (R), or color-coding, so as to be individually identified.

The markings can be provided by painting unless it raises any problem about the appearance of the aircraft. Alternatively, painting the markings and removing them afterward are also allowed.

If edges of the structure, or predetermined positions of pictures or logotypes painted on the aircraft body can be distinguished from the other positions, the distinctive portions can be used instead of the markings.

Figure 8:
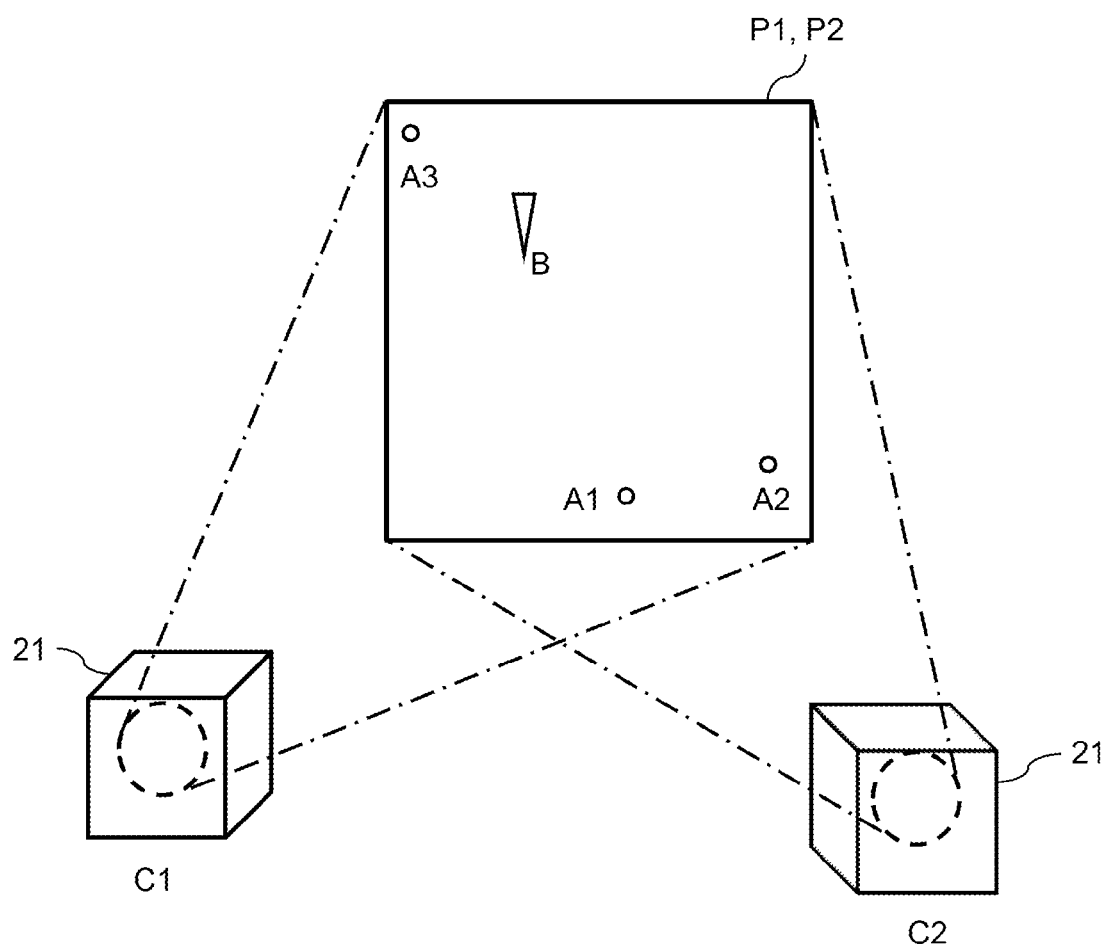
FIG. 8 is a diagram for illustrating how to capture a range including the damaged position and a plurality of reference points from different positions.

Next, as shown in FIG. 8, the range including the damaged position B and the first to third reference points A1 to A3 is captured by the camera 31 (capturing step S22).

At this point, two images P1 and P2 are obtained by capturing at different angles from capturing positions C1 and C2 using the camera 31. The images P1 and P2 each contain a set of the damaged position B, the first reference point A1, the second reference point A2, and the third reference point A3.

The distance between the capturing positions C1 and C2, and the orientation of the camera 31 are predetermined and known.

Data on the captured images P1 and P2 are taken in the information processing apparatus 12.

Next, the image processing section 32 calculates the space coordinate of the damaged position B (target coordinate) using the data on the images P1 and P2, the space coordinates of the respective first to third reference points A1 to A3, the position of the camera 31 and the focal length of the camera 31, and the parallax of the cameras 31 and 31, as appropriate (coordinate calculation step S23).

The image processing section 32 therefore geometrically associates the first to third reference points A1 to A3 and the damaged position B shown in the images P1 and P2 with one another, and performs the computation through the technique of triangulation or known image processing.

The image processing section 32 obtains the scale of the image data for the space coordinate system of the first to third reference points based on the distance between any two points of first to third reference points A1 to A3 obtained by calculating the known coordinates of the two points.

Obtaining the target coordinate of the damaged position B with the image processing section 32 allows for performing steps S14 to S18 that are the same as those of the first embodiment.

Specifically, the coordinate transforming section 19 transforms the target coordinate of the damaged position B into the reference coordinate in the coordinate system given to the image 171 in the electronic maintenance manual 17 (coordinate transforming step S14).

Next, the position specifying section 20 takes in the image data on image 171, superimposes the mark display M1 on the image 171 at the position corresponding to the reference coordinate, and displays the superimposed image on the screen 161 of the image displaying device 16 (mark image displaying step S15).

Then, a zone Z1 to which the damaged position B belongs is specified through visual inspection of the mark display M1 (zone specifying step S16).

Subsequently, accessing the maintenance information, such as the necessity of repair, and an applicable repair method, which is defined by for example, the state of the damage, the size of the damage, and a region such as the zones Z1 to Z4 (maintenance information accessing step S17), appropriate measures are taken based on the maintenance information (maintaining step S18).

According to the second embodiment described above, by performing the coordinate transforming process and the mark displaying process in addition to the image processing using the plurality of images P1 and P2 captured with the camera 31, the mark display M1 indicating the damaged position B is accurately and quickly displayed in the image 171 in the electronic maintenance manual 17. The appropriate measures is therefore quickly taken, which enables the aircraft to immediately return to service.

Also in the second embodiment, as with the first embodiment, it is preferable that the image data combined with the history mark display M2 that indicates a predetermined range around the reference coordinate contained in the maintenance history data, on the screen 161 (FIG. 4B).

In addition, also in the second embodiment, the plurality of sets of first to third reference points are set for respective parts of the aircraft.

The body of the aircraft can be divided into a plurality of parts such as the upper portion of a main wing, the lower portion of the main wing, the front side of the fuselage, the rear side of the fuselage, and a horizontal tail, such that the first to third reference points can be captured in one image at one time.

[Modification of Second Embodiment]

Figure 9:
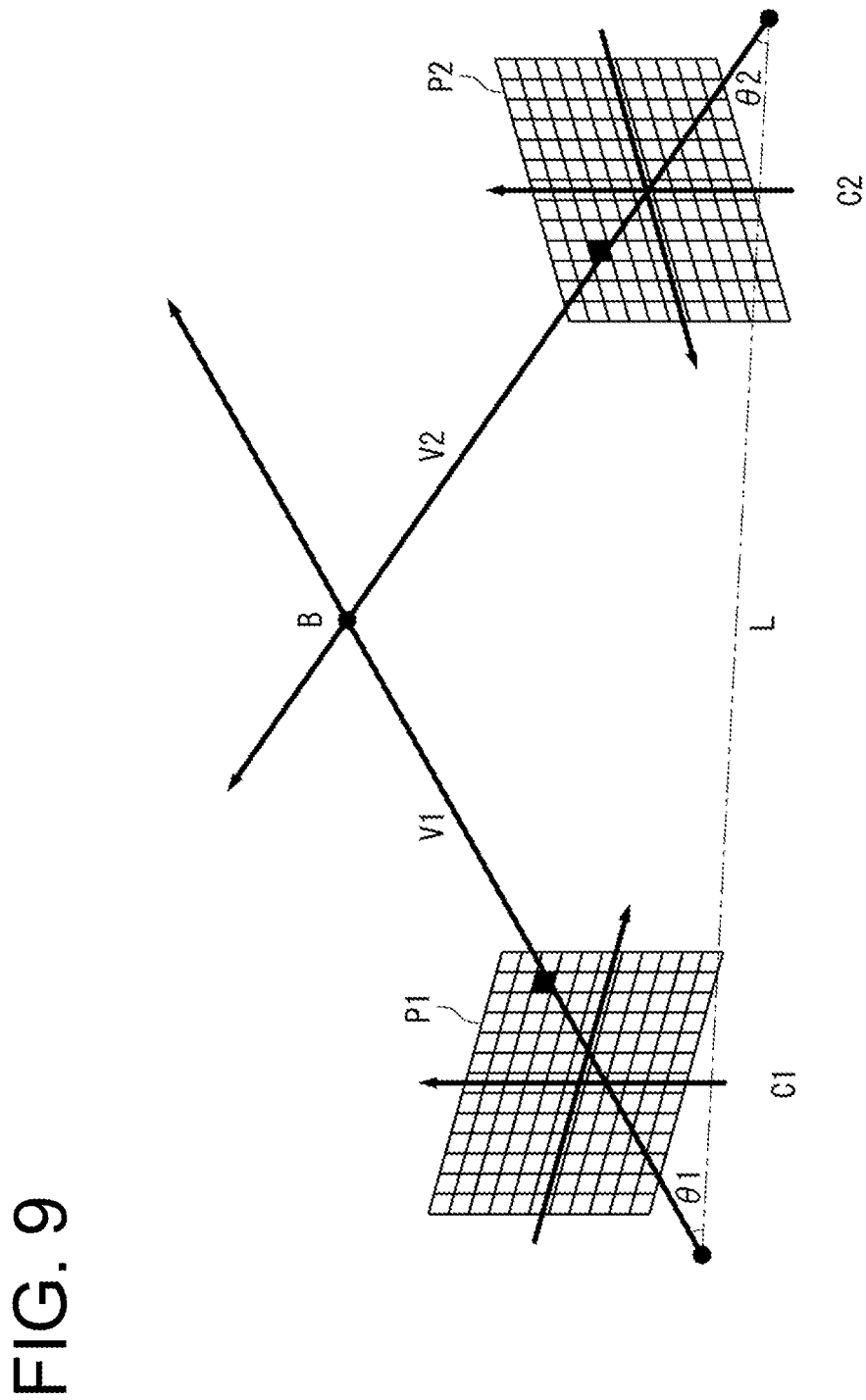
FIG. 9 is a diagram showing the principle of measuring a damaged position, in a modification of the second embodiment.

As shown in FIG. 9, if the damaged position B on the aircraft body is included in the images P1 and P2 that are captured from the different capturing positions C1 and C2, the damaged position B can be determined as an intersection (point) of lines of sight V1 and V2 of the images P1 and P2.

According to such a technique of stereo camera in which the capture in two directions, it is possible to calculate the space coordinate of the damaged position B (target coordinate) with the principle of triangulation using a distance L between the capturing positions C1 and C2, and the lines of sight V1 and V2 of the images P1 and P2.

The line of sight V1 is obtained by calculating an angle $\theta1$ that the line connecting the damaged position B and the capturing position C1 forms with the line connecting the capturing positions C1 and C2 (reference line). Similarly, the line of sight V2 is obtained by calculating an angle $\theta2$ that that the line connecting the damaged position B and the capturing position C2 with the line connecting the capturing positions C1 and C2 (reference line).

Alternatively, the coordinate of the damaged position can be obtained by projecting a light pulse to a range including the damaged position, and calculating the distance to the damaged position based on a period of time for which the light pulse is projected, returns after reflecting off a target object, and received by an image sensor.

Apart from the above, the configuration described in the above embodiments may be chosen or changed to other configurations as appropriate without departing from the gist of the present invention.

Figure 10A:
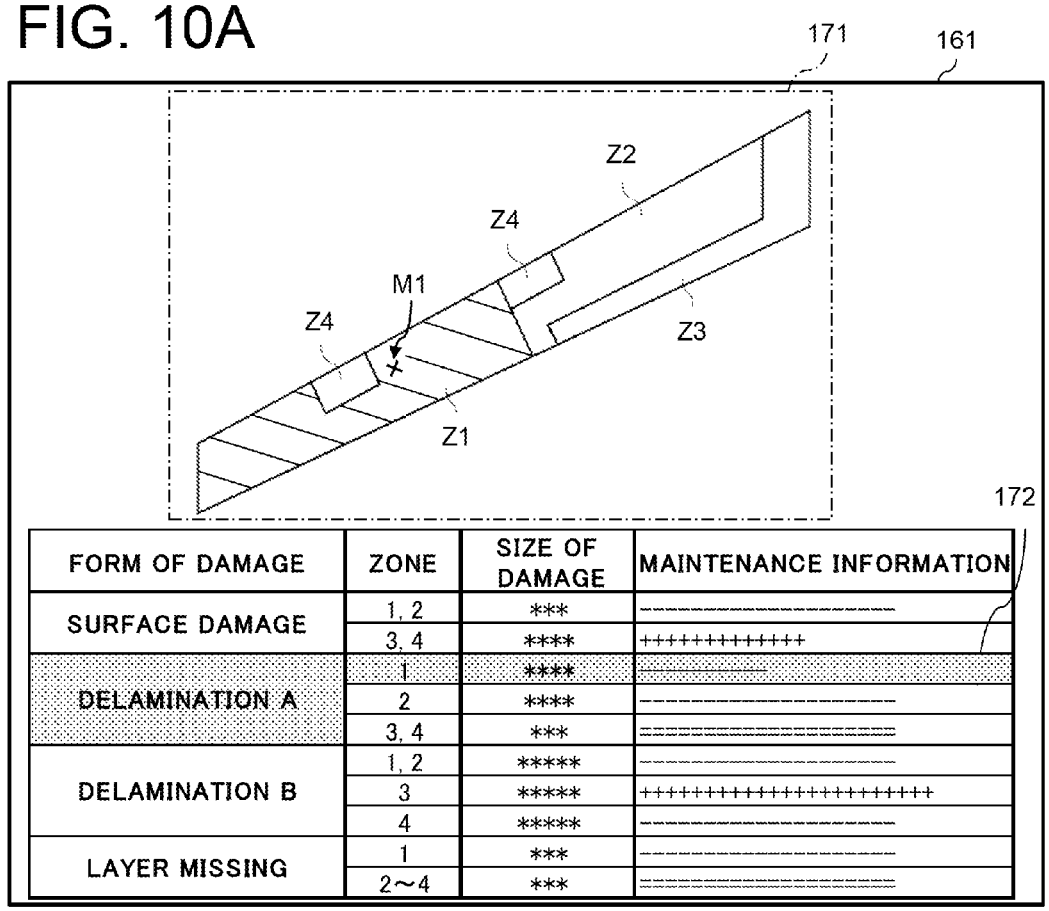
FIG. 10A and FIG. 10B are both diagrams showing modifications of the present invention.

As a method of specifying the damaged position B in the image 171 in the electronic maintenance manual 17, for example, as shown in FIG. 10A, the zone Z1 to which the damaged position B belongs can be displayed in a color, darkness, or pattern different from that of the other zones Z2 to Z4.

This allows for reliably confirming the zone Z1 to which the damaged position B belongs from the screen 161.

Furthermore, by displaying the maintenance information 172 corresponding to the zone Z1 similarly in a color or pattern different from that of other information in a table displayed in the screen 161, the maintenance information 172 can be prevented from being read incorrectly.

As shown in the first and second embodiments, when information necessary for the maintenance is provided for each zone, it is sufficient to specify the zone to which the damaged position B belongs as described above. From this viewpoint, it is allowable the zone is specified but the above-described mark display M1 is not displayed.

Figure 10B:
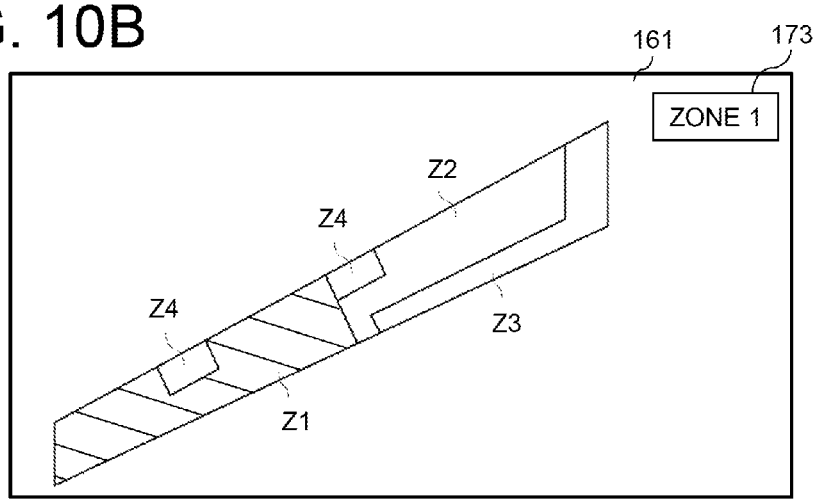

As a method of specifying a zone, as shown in FIG. 10B, the name of the corresponding zone may be displayed on the screen 161 as character information 173.

In the first embodiment, the targets are not necessarily to be disposed at the reference points A1 to A3. For example, if edges of the structure or predetermined positions of pictures or logotypes painted on the aircraft body can be distinguished from the other positions, laser beams can be caused to enter directly to the positions without disposing the targets.

If the processing unit is incorporated in the laser rangefinder 11 in the first embodiment, the above-described coordinate calculating process may be executed by the processing unit.

If the image processing section 32 has known image processing logic to individually identify markings provided on the reference points A1 to A3 and the damaged position B in the second embodiment, these markings do not need to be identified individually.

Furthermore, if the reference points A1 to A3 all of which are included in the captured images P1 and P2 can be identified through the image processing, the reference points A1 to A3 do not need to be provided with the markings.

In the case of a large structure such as an aircraft, as described above, a plurality of sets of reference points A1 to A3, each set corresponding to a part of the structure, (the number of reference points are two or more) may be determined, but the present invention allows determining only one set of reference points by using, for example, reflective members that relay laser light or a camera having a wide angle of view.

A set of reference points are naturally enough for a structure having such sizes that laser beams can reach everywhere in the structure or the structure can be captured in one image.

Here, image processing to couple a plurality of images allows for setting a plurality of reference points used to calculate the coordinates of the same target position across a capturing range made up of the plurality of images.

When the structure of an object to be maintained has a flat surface and known coordinates given as reference points are two-dimensional, a two-dimensional target coordinate indicating a target position are calculated by a coordinate calculating section.

In this case, the conversion of the target coordinate into a reference coordinate is not necessarily needed.

In addition, also in the case where a reference image that is referred to at the time of maintenance is a stereoscopic image (three-dimensional image), coordinate transformation from a target coordinate indicating the target position of the structure into a reference coordinate which is a three-dimensional coordinate is not necessarily needed.

That is, the position specifying section 20 may specify the position in the reference image 171 corresponding to the target coordinate with an indication. In addition, the maintenance history storing section saves the maintenance history data in which the target coordinate is associated with the reference image 171 in a memory, and if any associated maintenance history data is present when the reference image 171 is referred to, the maintenance history displaying section may specify the position corresponding to the target coordinate contained in the maintenance history data, in the reference image 171.

The present invention can be widely used to support the maintenance of common structures other than aircrafts.

What is claimed is:

1. A maintenance supporting system comprising:
a display that displays a reference image of a structure that is referred to when a target position on the structure undergoes maintenance; and
a processor that performs a calculation to associate the target position on the structure with a position in the reference image of the structure,
wherein the processor is configured to:
calculate a target coordinate which is a coordinate of the target position on the structure using known coordinates given to a plurality of reference points;
transform the target coordinate into a reference coordinate indicating a position corresponding to the target coordinate in a form of a coordinate in a coordinate system given to the reference image; and
specify the position in the reference image of the structure corresponding to the target coordinate, with an indication on the display.

2. A maintenance supporting method using a processor that performs a calculation to associate a position in a reference image of a structure that is referred to when any target position on the structure undergoes maintenance with a position on the structure, the maintenance supporting method comprising:
calculating a target coordinate which is a coordinate of the target position on the structure using known coordinates given to a plurality of reference points;
transforming the target coordinate into a reference coordinate which is a coordinate in a coordinate system given to the reference image; and
specifying a position in the reference image of the structure corresponding to the target coordinate, with an indication.

3. The maintenance supporting system according to claim 1, wherein the processor is further configured to calculate the target coordinate using, in addition to the known coordinates, a plurality of captured images that are obtained by capturing the target position and the plurality of reference points from different positions.

4. The maintenance supporting system according to claim 3, wherein individually identifiable markings are provided on the structure at the target position and the reference points.

5. The maintenance supporting system according to claim 1, wherein the processor is further configured to calculate the target coordinate using, in addition to the known coordinates, distances between the plurality of reference points and the target position.

6. The maintenance supporting system according to claim 5, further comprising a laser range finder to measure the distances.

7. The maintenance supporting system according to claim 1, wherein the processor is further configured to specify a region to which the position corresponding to the target coordinate belongs, from among a plurality of regions that are set to members making up the structure in the reference image, with an indication on the display.

8. A maintenance supporting system comprising: memory; a display that displays a reference image of a structure that is referred to when a target position on the structure undergoes maintenance; and a processor that performs a calculation to associate the target position on the structure with a position in the reference image of the structure, wherein the processor is configured to: calculate a target coordinate which is a coordinate of the target position on the structure using known coordinates given to a plurality of reference points; transform the target coordinate into a reference coordinate indicating the position corresponding to the target coordinate in a form of a coordinate in a coordinate system given to the reference image; specify a position in the reference image of the structure corresponding to the target coordinate, with an indication on the display; wherein the processor is further configured to: save maintenance history data in which the target coordinate is associated with the reference image in the memory; and if any associated maintenance history data is present when the reference image is referred to, specify the position corresponding to the target coordinate contained in the maintenance history data in the reference image.

9. The maintenance supporting system according to claim 1, wherein, maintenance information corresponding to the specified position is displayed on the display.

10. The maintenance supporting system according to claim 1, wherein the processor is included in a computer.

11. The maintenance supporting system according to claim 10, further comprising memory that stores an electronic maintenance manual that provides information necessary for maintenance, wherein the reference image is contained in the electronic maintenance manual.

12. The maintenance supporting system according to claim 1, wherein the structure is of an aircraft.

13. The maintenance supporting method according to claim 2 further comprising:
displaying the reference image of the structure for reference when the target position on the structure undergoes maintenance.

14. The maintenance supporting method according to claim 2, further comprising:
disposing targets which light emitted from the target position enters, at the plurality of reference points; and
measuring distances between the plurality of reference points and the target position by utilizing the reflection of light, wherein
the target coordinate is calculated using the distances in addition to the known coordinates.

15. The maintenance supporting method according to claim 2, wherein the structure is of an aircraft.

16. A maintenance method comprising the maintenance supporting method according to claim 2, and further comprising:
accessing maintenance information corresponding to the specified position; and
taking measures based on the maintenance information.

17. A non-transitory computer-readable medium having stored thereon, instructions that when executed by a computing device, cause the computing device to perform the method of claim 2.

* * * * *